(12) United States Patent  (10) Patent No.: US 9,238,477 B2
Ahern et al.  (45) Date of Patent: Jan. 19, 2016

(54) METHOD AND SYSTEM FOR A LIFT DEVICE HAVING INDEPENDENTLY STEERABLE WHEELS

(71) Applicant: Xtreme Manufacturing, LLC, Las Vegas, NV (US)

(72) Inventors: Don Francis Ahern, Las Vegas, NV (US); Ronald Lee Fifield, Las Vegas, NV (US)

(73) Assignee: XTREME MANUFACTURING, LLC, Las Vegas, NV (US)

( * ) Notice: Subject to any disclaimer, the term of this patent is extended or adjusted under 35 U.S.C. 154(b) by 11 days.

(21) Appl. No.: 14/195,629

(22) Filed: Mar. 3, 2014

(65) Prior Publication Data

US 2015/0246684 A1  Sep. 3, 2015

(51) Int. Cl.
*B62D 5/04* (2006.01)
*B66F 11/04* (2006.01)
*B62D 6/00* (2006.01)

(52) U.S. Cl.
CPC .............. *B62D 5/0457* (2013.01); *B62D 6/001* (2013.01); *B66F 11/042* (2013.01)

(58) Field of Classification Search
CPC ...... B62D 5/0457; B62D 6/001; B66F 11/042
See application file for complete search history.

(56) References Cited

U.S. PATENT DOCUMENTS

| | | | |
|---|---|---|---|
| 2,625,443 A | 1/1953 | Sensenbaugh | |
| 4,175,644 A | 11/1979 | Sikli | |
| 4,598,797 A | 7/1986 | Schultz | |
| 4,599,030 A | 7/1986 | Skaalen et al. | |
| 5,148,885 A | 9/1992 | Weyer | |
| 5,547,038 A | 8/1996 | Madwed | |
| 5,570,754 A | 11/1996 | Stimson | |
| 5,685,173 A * | 11/1997 | De L'Isle et al. | 62/646 |
| 6,540,039 B1 | 4/2003 | Yu et al. | |
| 6,883,641 B2 | 4/2005 | Julien | |
| 7,717,210 B2 | 5/2010 | Mahy et al. | |
| 8,215,441 B2 * | 7/2012 | Wierzba et al. | 180/253 |
| 8,262,109 B1 * | 9/2012 | Bell et al. | 280/93.506 |
| 8,332,089 B2 * | 12/2012 | Nakazawa | 701/22 |

(Continued)

OTHER PUBLICATIONS

Google scholar search; https://scholargoogle.com/scholar?hl=en&q=travel+program+scissor+lift&btnG=&as_sdt=%2C47&as_sdtp=; travel program scissor lift—Google Scholar.pdf.*

(Continued)

*Primary Examiner* — James Trammell
*Assistant Examiner* — James E Stroud
(74) *Attorney, Agent, or Firm* — Armstrong Teasdale LLP

(57) ABSTRACT

A system and method of controlling a scissors lift vehicle are provided. The scissors lift vehicle system includes a carriage including a plurality of independently steerable wheel assemblies configured to engage a travel surface. The plurality of independently steerable wheel assemblies, each steerable about a steer axis of rotation include one of the plurality of wheel assemblies being designated a master wheel and the remaining wheel assemblies being designated slave wheels. The wheel assemblies each include a variable-speed steer actuator configured to rotate a respective wheel assembly about the steer axis of rotation of that wheel assembly at a selectable rate. The wheel assemblies each also include a wheel including a respective drive axis of rotation and a variable-speed drive actuator configured to rotate that wheel about a respective steer axis of rotation at a selectable rate.

20 Claims, 13 Drawing Sheets

(56) References Cited

U.S. PATENT DOCUMENTS

| | | |
|---|---|---|
| 2004/0062630 A1 | 4/2004 | Marrero |
| 2004/0149498 A1 | 8/2004 | Nakashima |
| 2005/0183896 A1 | 8/2005 | Fenelli et al. |
| 2006/0151252 A1 | 7/2006 | Joos |
| 2006/0225955 A1 | 10/2006 | Murphy |
| 2008/0087484 A1 | 4/2008 | Fenelli et al. |
| 2008/0097666 A1 | 4/2008 | Oba et al. |
| 2010/0224343 A1* | 9/2010 | Fukuma et al. ............. 165/67 |
| 2011/0224872 A1 | 9/2011 | Reed |
| 2012/0043159 A1 | 2/2012 | Clark et al. |
| 2013/0184960 A1 | 7/2013 | Wetterer et al. |

OTHER PUBLICATIONS

International Search Report and Written Opinion, dated Jun. 8, 2015, for co-pending International application No. PCT/US2015/017685 (16 pgs.).

* cited by examiner

METHOD AND SYSTEM FOR A LIFT DEVICE HAVING INDEPENDENTLY STEERABLE WHEELS

BACKGROUND

This description relates to lift devices, and, more particularly, to mobile elevating work platform systems and methods of controlling the operation of mobile elevating work platforms.

Various types of mobile elevating work platforms have a lift mechanism that can be moved in a vertical direction to bring a worker close to otherwise inaccessible locations. The lift mechanism is often mounted to a self-propelled carriage or chassis having wheels for moving the platform between work areas. In one type of mobile elevating work platforms, the lift mechanism to achieve the vertical lift is often referred to as a "scissor lift," in which a plurality of linked, folding supports oriented in a crisscross or "X" pattern in a "scissors stack." The upward motion is achieved by the application of a force to a set of parallel linkages, elongating the crossing pattern, and propelling the work platform vertically. With the scissors stack mounted on the carriage above the wheels, the wheels, steering configuration, and propulsion configuration are typically a standard arrangement of axles, wheels, linkage arms, and motors or drives. Such convention steering limits the motion of the mobile work platform. For example, a turn radius is limited and the ability to crab the platform in a direction without turning it is virtually non-existent.

Scissors lift devices are most useful if they are self-propelled. Current scissor lift designs have many of the propelling features mounted under the scissors lift assembly. A hydraulic system, electrical system including batteries, and a control system are also typically mounted on the carriage below the scissors lift assembly. Additionally, axles, steering and transmission components are also mounted on the carriage under the scissors lift assembly. Accordingly, because of the equipment located under the scissors lift assembly on the carriage, the height of the work platform that carries a user to the work area is greatly elevated above the floor surface. To gain access to the work platform of known scissors lift assemblies, the user must climb onto the platform, usually using several ladder steps attached to the carriage and/or platform, and usually carrying tools, equipment, and/or repair parts. Such access is dangerous and laborious for the user. Moreover, mounting the scissors lift assembly on top of the carriage increases the height of the scissors lift vehicle when the scissors lift assembly is fully retracted. The increased height limits areas that the scissors lift vehicle can access.

BRIEF DESCRIPTION OF THE DISCLOSURE

In one aspect, a scissors lift vehicle includes a carriage including a plurality of independently steerable wheel assemblies configured to engage a travel surface. The plurality of independently steerable wheel assemblies, each steerable about a steer axis of rotation include one of the plurality of wheel assemblies being designated a master wheel and the remaining wheel assemblies being designated slave wheels. The wheel assemblies each include a variable-speed steer actuator configured to rotate a respective wheel assembly about the steer axis of rotation of that wheel assembly at a selectable rate. The wheel assemblies each also include a wheel including a respective drive axis of rotation and a variable-speed drive actuator configured to rotate that wheel about a respective steer axis of rotation at a selectable rate.

In another aspect, a method of controlling a scissors lift vehicle includes receiving a steer command from a user input device, determining a first steering speed command for a first wheel assembly based on the steer command, the first wheel assembly independent of all other wheel assemblies, and determining a target steering angle for a second wheel assembly, the target steering angle based on a current steering angle of the first wheel assembly. The method further includes determining a second steering speed command for the second wheel assembly based on a difference between a current steering angle of the second wheel assembly and the determined target steering angle, and altering a course of travel of the scissors lift vehicle using the first and second steering speed commands.

In yet another aspect, scissors lift vehicle includes a carriage having a plurality of independently steerable wheel assemblies wherein one wheel is designated as a master wheel assembly and a reminder of the wheel assemblies are designated as being slave wheel assemblies. Each wheel assembly includes a wheel configured to engage a travel surface and a steer axis of rotation where one of the plurality of wheels is positioned proximate each corner of the carriage. The scissors lift vehicle also includes a scissors stack assembly coupled to the carriage. The scissors stack assembly includes a plurality of scissors linkages extendable from a retracted position, where the scissors linkages are approximately horizontally configured to an extended position, where the scissors linkages are approximately orthogonally configured with respect to each other. The scissors lift vehicle also includes a user input device configured to generate a steer command, a steering angle position sensor coupled to each independently steerable wheel assembly and configured to generate a current steering angle position signal, and a processor communicatively coupled to a memory device that includes instructions that are executable by the processor. The processor is configured to receive the steer command from the user input device, generate a maximum speed steering rate command for the master wheel assembly using the received steer command, determine a target steering angle for each slave wheel assembly based on a current steering angle of the master wheel assembly, generate a steering rate command for each of the slave wheel assemblies, the steering rate command proportional to a difference between the determined target steering angle for each slave wheel assembly and its current steering angle, and transmit a respective generated steering rate command to each slave wheel assembly.

BRIEF DESCRIPTION OF THE DRAWINGS

FIG. 1 is a side elevation view of a scissors lift vehicle in accordance with an example embodiment of the present disclosure.

FIG. 2 is an exploded view of a linear steer guide assembly that may be used with the scissors lift vehicle shown in FIG. 1.

FIG. 3 is a perspective view of the linear steer guide assembly shown in FIG. 1 in an assembled state.

FIG. 4 is a perspective view of a wheel assembly shown in FIG. 1 with a follower at an end of travel towards a second end, which positions a wheel at approximately a 90° angle with respect to a reference representing the carriage shown in FIG. 1.

FIG. 5 is a perspective view of a wheel assembly 104 shown in FIG. 1 with the follower at approximately mid-travel between the first end and the second end, which centers the wheel with respect to the carriage shown in FIG. 1.

FIG. 6 is a perspective view of a wheel assembly shown in FIG. 1 with the follower at an end of travel towards the first end, which positions the wheel at approximately a −60° angle with respect to the carriage shown in FIG. 1.

FIG. 7 is a schematic block diagram of a steering control system used to control the wheel assemblies of the scissors lift vehicle.

FIG. 8 is a plan view of the carriage shown in FIG. 1 illustrating a wide turn about a center point.

FIG. 9 is a plan view of the carriage shown in FIG. 1 illustrating a narrow turn about a center point.

FIG. 10 is a plan view of carriage shown in FIG. 1 illustrating a wide turn about a center point positioned abeam the carriage.

FIG. 11 is a plan view of the carriage shown in FIG. 1 illustrating a narrow turn about a center point positioned closely abeam the carriage.

FIG. 12 is a plan view of the carriage shown in FIG. 1 illustrating a crab movement of the carriage.

FIG. 13 is a flow diagram of a method of controlling the scissors lift vehicle shown in FIG. 1 that includes a plurality of wheel assemblies.

Figure 1:
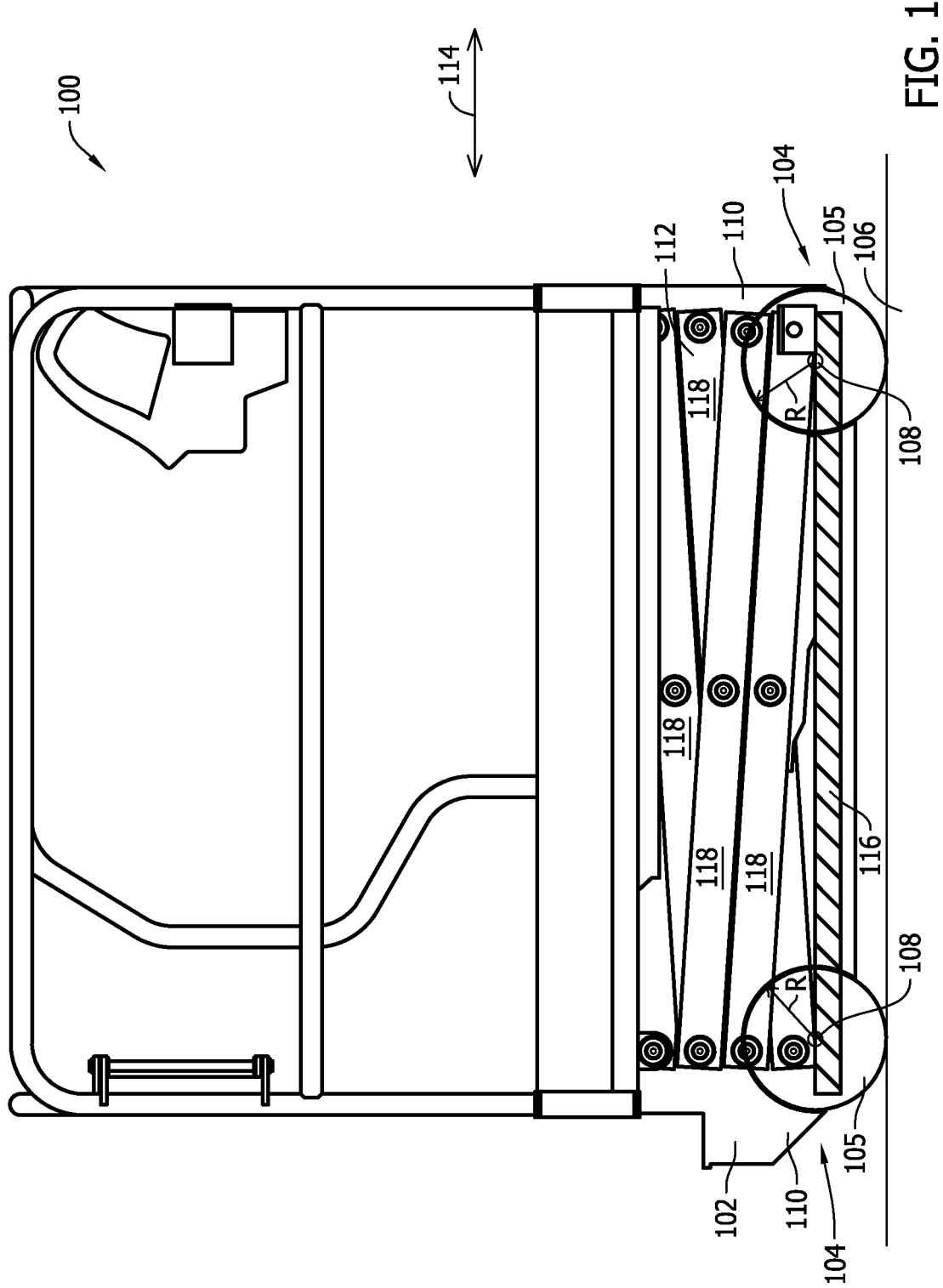
FIGS. 1-13 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of the disclosure by way of example and not by way of limitation. It is contemplated that the disclosure has general application to embodiments of a scissors lift vehicle and a method of operating a scissors lift vehicle.

In the example embodiment, the scissors lift vehicle includes a carriage comprising a plurality of independently steerable wheels configured to engage a travel surface. The travel surface could be any sufficiently smooth surface, which permits the scissors lift vehicle to operate thereon, for example, but not limited to an asphalt surface. Travel surface may be, for example, concrete, wood, carpet, tile, or other surface in an indoor application of the scissors lift vehicle. The wheels are configured to rotate about an axle having a drive axis of rotation, the wheel powered by a respective drive unit, such as, but not limited to an electric drive motor coupled directly to the wheel or to the wheel through a gear or transmission assembly. Typically, one wheel is positioned at or near each corner of the rectangularly-shaped carriage. The wheels are spaced as far as possible to improve the stability of the scissors lift vehicle, especially when the scissors stack assembly is extended. In various embodiments, more than four wheels, one at each corner may be used. Additionally, carriage may not be regularly-shaped, but may have other shapes, where additional wheels could be used. The wheels may be spaced apart in a fore/aft direction and in a right/left or athwartships direction. At least some of the wheel assemblies are configured to steer a respective wheel independently with respect to wheels associated with a remainder of the plurality of wheel assemblies. Some wheels may be steerable by their respective wheel assemblies, some wheels may be fixed with respect to the carriage, and some wheels may simply follow the carriage.

In various embodiments, the wheel assembly includes a linear steer guide assembly. The linear guide assembly includes a linear drive device configured to translate a follower along a linear path. The linear drive device may be embodied in, for example, a ball screw assembly or lead screw assembly coupled to a steer motor, a hydraulic or pneumatic piston assembly, or other linear driver. The linear guide assembly also includes a steering bracket coupled to a wheel bracket. The wheel bracket is configured to support the wheel associated with the respective wheel assembly. The steering bracket includes a tab and is configured to rotate about a steer axis of rotation. The linear guide assembly also includes a steer link coupled between the follower and the tab, the steer link is configured to rotate the steering bracket through the tab using the linear motion of the follower. A steering angle position sensor associated with each steerable wheel is configured to detect a relative angular position of the wheel and to generate a steering angle position signal. A user input device is configured to receive a manual input from, for example, an operator, and to generate a steering command signal. The user input device is embodied in a single-axis input device, a two-axis, a keyboard, switches, joystick, trackball, mouse, other input device, or combinations thereof. In various embodiments, the steering command signal and the steering angle position signal are used to generate a wheel position command signal.

In the example embodiment, the scissors stack assembly includes a plurality of scissors linkages extendable from a retracted position, where the scissors linkages are approximately horizontally configured to an extended position, where the scissors linkages are approximately orthogonally configured with respect to each other. The scissors stack assembly is pivotally coupled to the base through a first pair of scissors linkages and is slidably coupled to the base through a second pair of scissors linkages. The base includes a slot configured to receive a pin. The base and the first pair of scissors linkages are coupled in a pivotal joint. The base and the second pair of scissors linkages are coupled in a slidable joint using the slot and pin. The pivotal joint and the slidable joint are located between the wheels spaced apart in the right/left direction and within a profile of the wheels.

The scissors lift vehicle may also include a battery compartment coupled to or formed in the carriage and that extends between the fore and aft spaced wheels and is positioned outboard of the scissors stack assembly. The battery compartment includes a power source configured to supply a total electrical requirement of the scissors lift vehicle. The scissors lift vehicle may include a plurality of battery compartments. Each battery compartment is located between the fore and aft wheels on each side of the scissors lift vehicle. Typically, the power source is a battery. In some embodiments, the power source may be embodied in an engine.

Because some of the applications for the scissors lift vehicle include lifting workers and their equipment in the interior of buildings, the scissors lift vehicle size is limited to in an athwartships direction to a distance that is less than typical door openings. The width of typical door openings may vary by geographic location, which would tend to dictate the desirable width of the scissors lift vehicle.

The following description refers to the accompanying drawings, in which, in the absence of a contrary representation, the same numbers in different drawings represent similar elements.

FIG. 1 is a side elevation view of a scissors lift vehicle 100 in accordance with an example embodiment of the present disclosure. In the example embodiment, scissors lift vehicle 100 includes a carriage 102 that includes a plurality of independently steerable wheel assemblies 104, each wheel assembly 104 includes a respective wheel 105 configured to engage a travel surface 106 during operation of scissors lift vehicle 100. Travel surface 106 could be an asphalt surface in an outdoor application of scissors lift vehicle 100 or may be concrete, wood, carpet, tile, or other surface in an indoor application of scissors lift vehicle 100. Wheels 105 are configured to rotate about a drive axis of rotation 108 and may be powered by a dedicated motor (not shown) coupled directly to each wheel 105. Wheels include a circular profile having a radius R and are spaced apart from each other along an underside of carriage 102. Typically, one wheel assembly 104 is positioned at or near each corner 110 of rectangularly-shaped carriage 102. In various embodiments, wheel assemblies 104 are spaced as far as possible to improve the stability of scissors lift vehicle 100, especially when a scissors stack assembly 112 is extended to lift a platform 113 to a working height. In various embodiments, more than four wheels 105 are used. Additionally, carriage 102 is not necessarily rectangularly-shaped, but may have other shapes, where additional wheels 105 could be used. Wheels 105 are spaced apart in a fore/aft direction 114 and in a right/left or athwartships direction (i.e., into or out of the page). Wheels 105 may be spaced from each other unequal distances apart, for example, a track of the fore wheels may be wider or narrower than the track of the aft wheels.

A base 116 is coupled to or formed with carriage 102 between wheels 105 spaced apart in the right/left direction and is positioned vertically such that base 116 lies within a profile of wheels 105.

In the example embodiment, scissors stack assembly 112 includes a plurality of scissors linkages 118 pivotally coupled together and extendable from a retracted position (shown in FIG. 1), to an extended position (not shown in FIG. 1).

Figure 2:
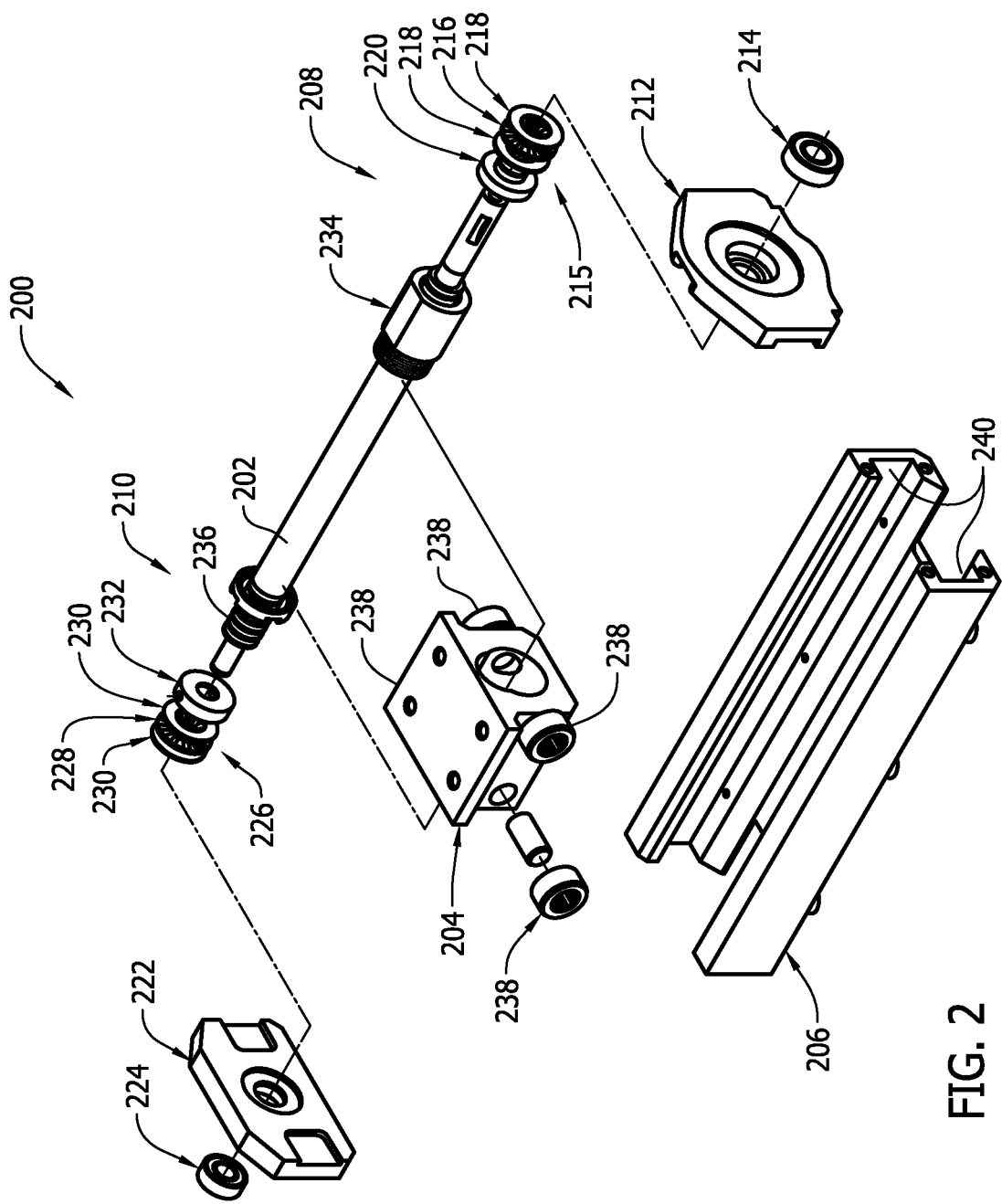
Figure 3:
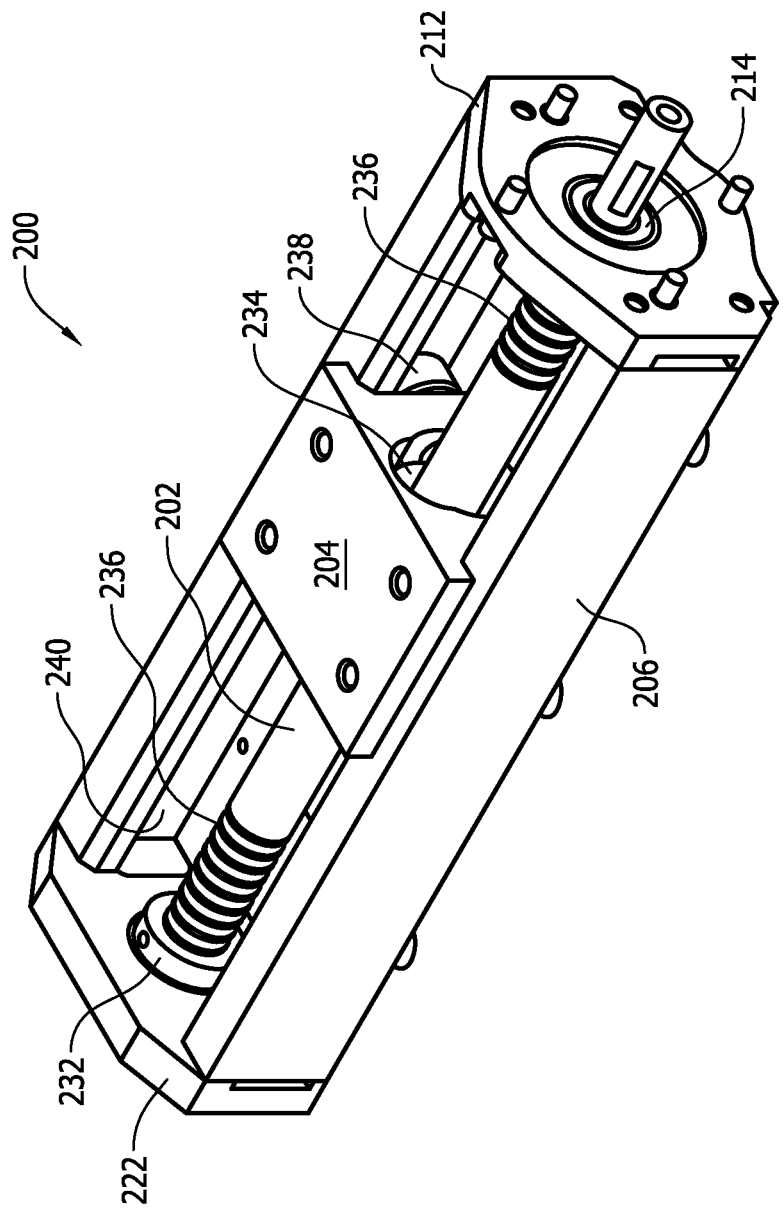

FIG. 2 is an exploded view of a linear steer guide assembly 200 that may be used with scissors lift vehicle 100 (shown in FIG. 1). FIG. 3 is a perspective view of linear steer guide assembly 200 in an assembled state. In the example embodiment, linear steer guide assembly 200 includes a linear drive device 202 configured to translate a follower 204 along a linear path. In the example embodiment, linear drive device 202 is a ball screw, however in other embodiments a fluid cylinder or other linear driver may be used. A steer rail 206 is used to guide follower 204 along the linear path from a first end 208 of ball screw 202 to a second end 210 of ball screw 202. First end 208 is supported radially in a motor end steer guide cap 212 using a ball bearing 214 and is constrained axially using a thrust bearing assembly 215 including a thrust bearing 216 and shims 218. A ball screw stop 220 provides a surface for thrust bearing assembly 215 to engage between ball screw 202 and motor end steer guide cap 212. Second end 210 is supported radially in a fixed end steer guide cap 222 using a ball bearing 224 and is constrained axially using a thrust bearing assembly 226 including a thrust bearing 228 and shims 230. A ball screw stop 232 provides a surface for thrust bearing assembly 226 to engage between ball screw 202 and fixed end steer guide cap 222.

A ball nut 234 engages threads 236 on ball screw 202. A steer motor (not shown in FIG. 2 is coupled to first end 208 and when energized, rotates ball screw 202 in a predetermined direction to translate ball nut 234 in a desired direction. Ball nut 234 is coupled to follower 204 causing follower 204 to be translated with ball nut 234. Follower 204 rides along steer rail 206 using cam followers 238 riding in a track 240.

Figure 4:
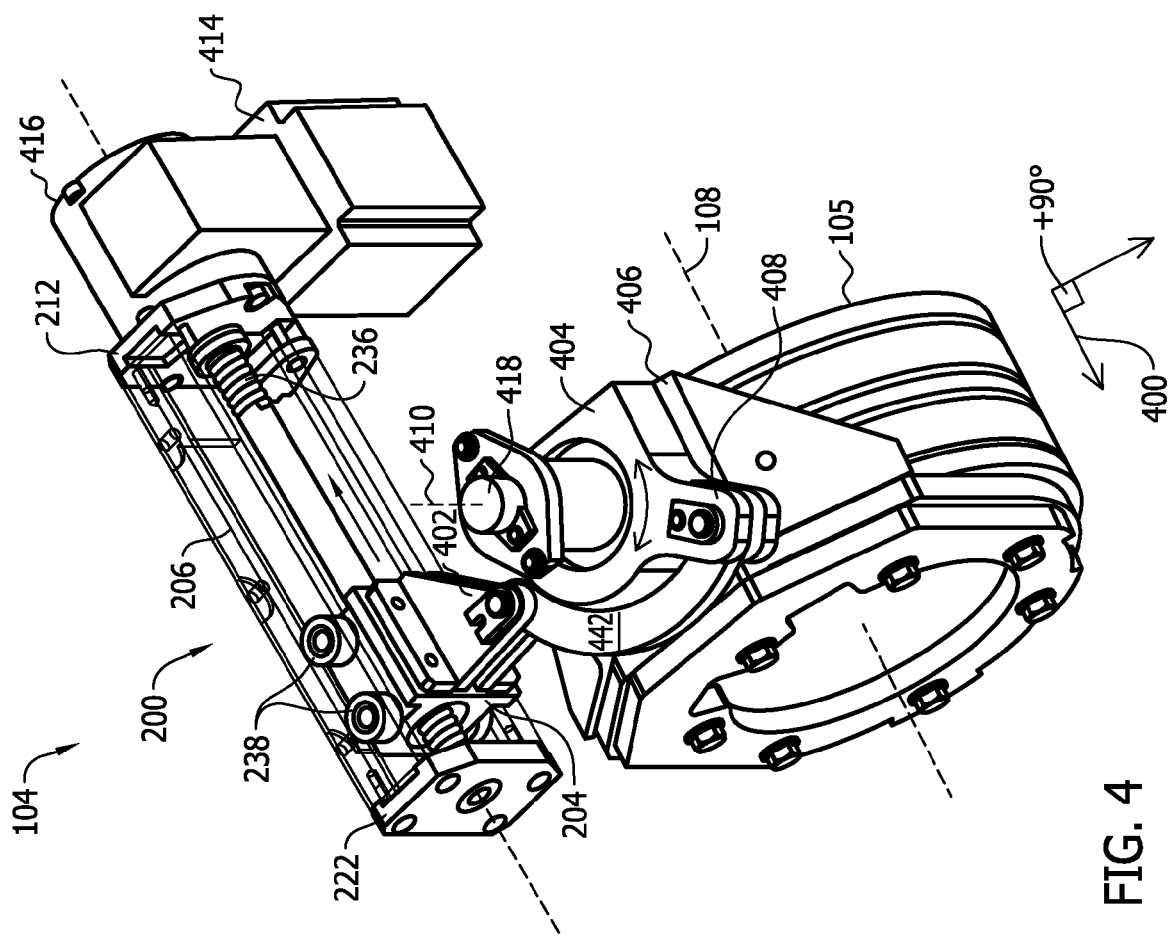
Figure 5:
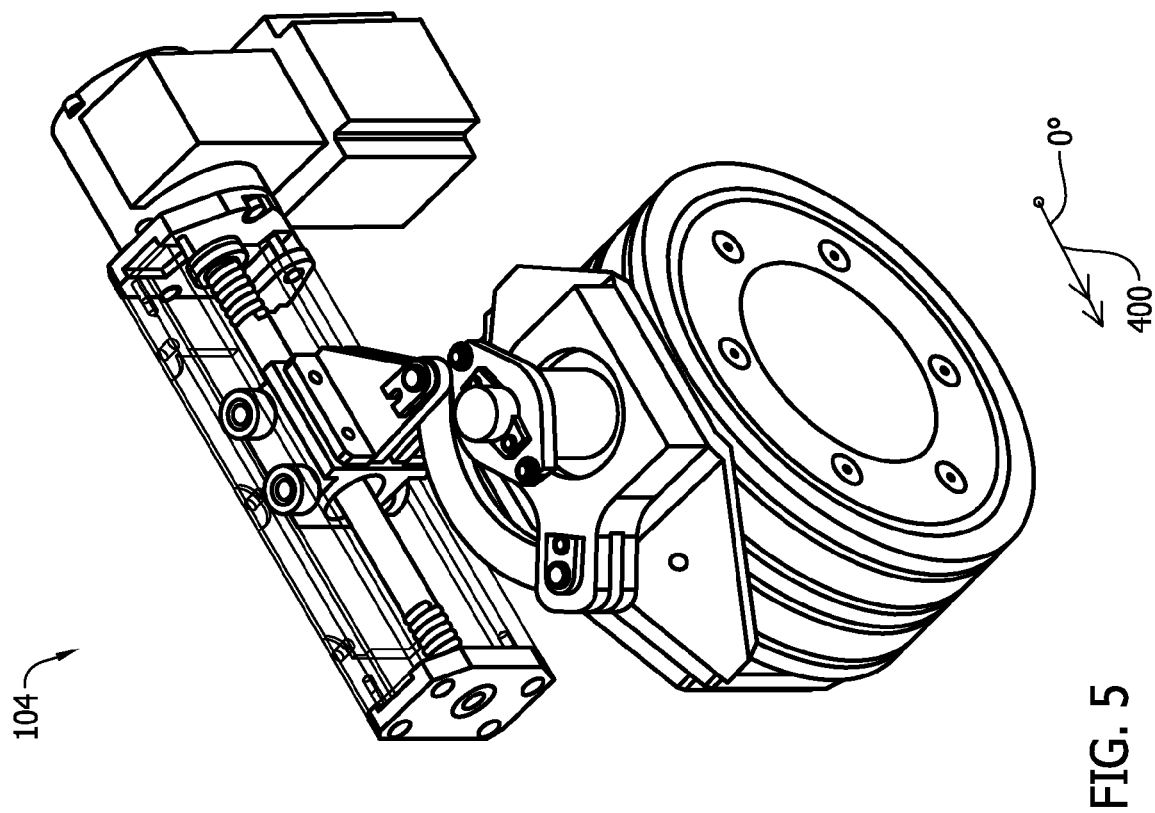
Figure 6:
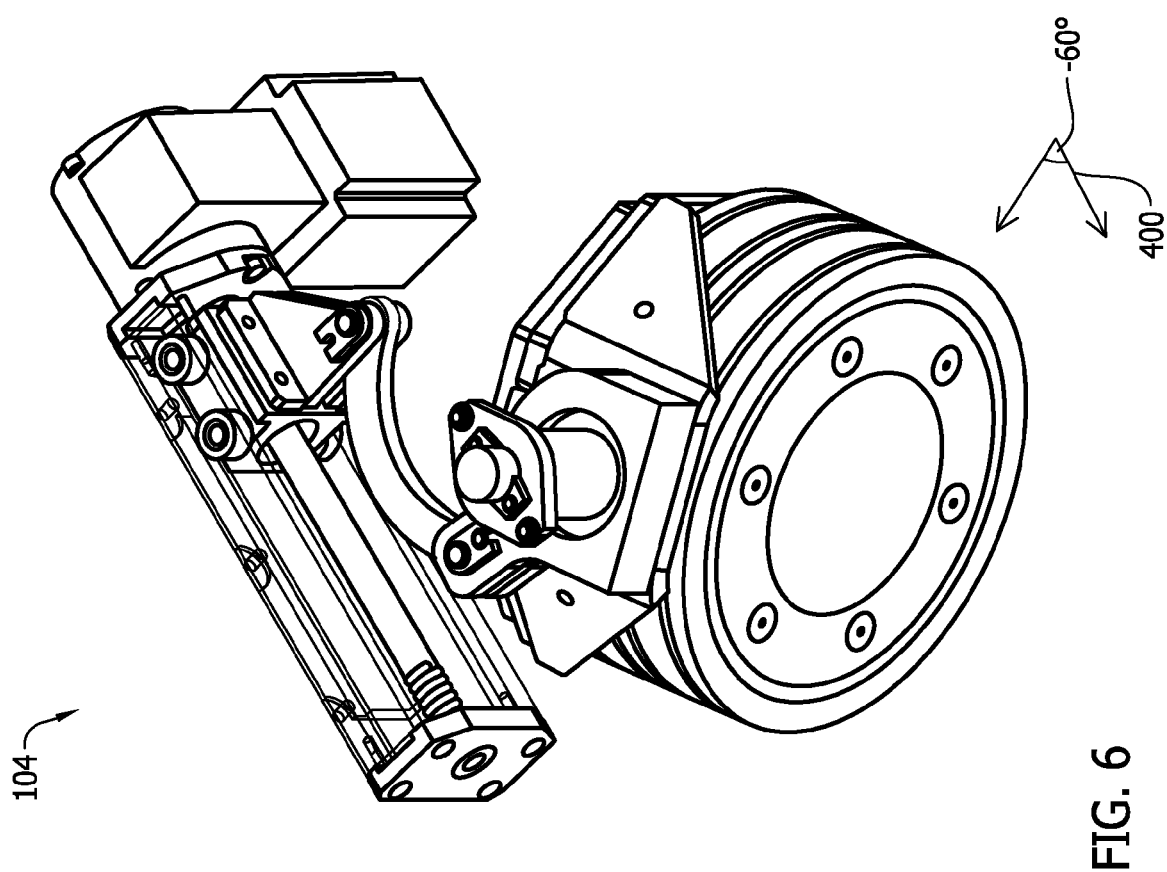

FIG. 4 is a perspective view of a wheel assembly 104 (shown in FIG. 1) with follower 204 at an end of travel towards second end 210, which positions wheel 105 at approximately a 90° angle with respect to a reference representing carriage 102 (shown in FIG. 1). FIG. 5 is a perspective view of a wheel assembly 104 (shown in FIG. 1) with follower 204 at approximately mid-travel between first end 208 and second end 210, which centers wheel 105 with respect to carriage 102 (shown in FIG. 1). FIG. 6 is a perspective view of a wheel assembly 104 (shown in FIG. 1) with follower 204 at an end of travel towards first end 208, which positions wheel 105 at approximately a −60° angle with respect to carriage 102 (shown in FIG. 1).

A follower bracket 402 is coupled to follower 204. A steering bracket 404 is coupled to a wheel bracket 406, which is configured to support wheel 105 associated with wheel assembly 104. Steering bracket 404 includes a tab 408 and is configured to rotate about a steer axis of rotation 410. A steer link 412 is coupled between follower bracket 402 and tab 408. Steer link 412 is configured to rotate steering bracket 404 through tab 408 using linear motion of follower 204.

In the example embodiment, linear drive device 202 is coupled to a steer motor 414 through a gear box 416 or directly. A steering angle position sensor 418 is associated with each steerable wheel or with all wheels as needed. Steering angle position sensor 418 is configured to detect a relative angular position of wheel 105 and to generate a steering angle position signal.

Figure 7:
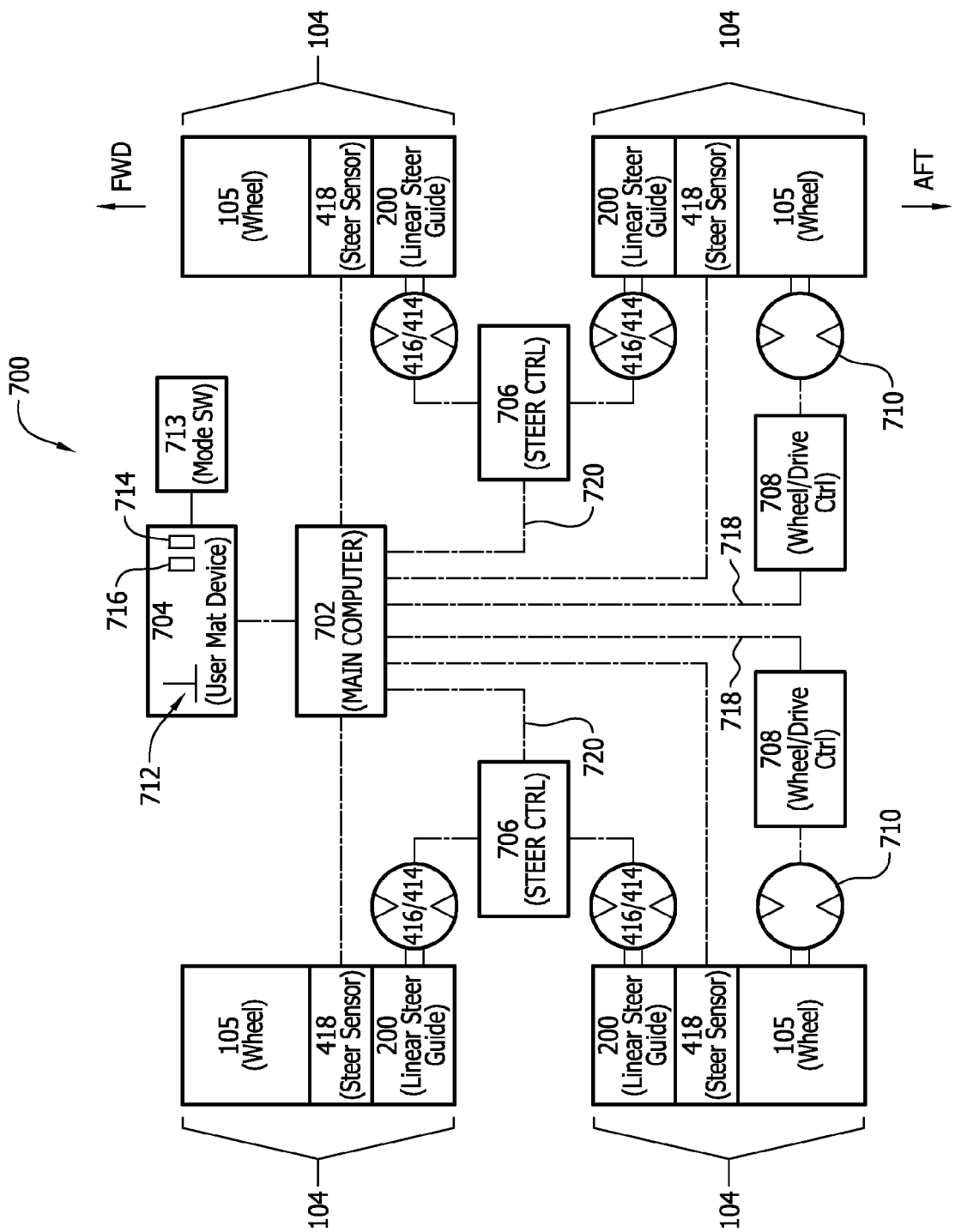

FIG. 7 is a schematic block diagram of a steering control system 700 used to control wheel assemblies 104 of scissors lift vehicle 100. In the example embodiment, steering control system 700 includes a main computer device 702 that is communicatively coupled to a user input device 704, one or more steer controllers 706, and one or more drive controllers 708. In the example embodiment, two wheels 105 are driven and two wheels 105 free-wheel. In various embodiments, all wheels 105 are driven wheels 105, each wheel 105 being associated with a respective drive controller 708. Main computer device 702 is also communicatively coupled to a steering angle position sensor 418 in each wheel 105. Each drive controller 708 is electrically coupled to a drive motor 710 associated with a respective wheel 105. Each steer controller 706 is associated with a respective steer motor 414 and gear box 416. In the example embodiment, user input device 704 includes a joystick speed control input 712, a right turn pushbutton 714, and a left turn pushbutton 716. Although illustrated as separate devices, main computer device 702, steer controllers 706, and drive controllers 708 may be embodied in a single device.

During operation, speed in a forward or reverse direction is controlled using joystick speed control input 712. Moving joystick 712 forward a selectable amount generates a speed command 718 that is proportional to an amount of travel of joystick 712. In some cases, the speed command may be constrained by other conditions of scissors lift vehicle 100, for example, by an interlock or an algorithm to prevent unsafe operation of scissors lift vehicle 100.

Pressing right turn pushbutton 714 starts a right turn operation. One wheel 105 of all the wheels is designated as a master wheel and the remaining wheels are designated as slave wheels to the master wheel. Main computer generates a unique steer command 720 for each wheel separately. Main computer 702 generates a steer command for the master wheel that is either full on or full off in a direction that rotates the master wheel toward a right hand turn position. The master wheel is controlled using an open-loop control scheme in that when right turn pushbutton 714 is pressed, the master wheel begins turning towards a right turn direction at full speed (i.e., steer motor 414 is commanded to maximum RPM). When right turn pushbutton 714 is released, the master wheel stops turning and maintains its current steering angle (i.e., steer motor 414 is commanded to zero RPM). Each of the slave wheel steering is controlled by a closed-loop control scheme. As the master wheel is turning, main computer 702 then generates respective steer commands for each of the slave wheels to maintain synchronism with the master wheel. Each slave wheel is synchronized with the master wheel by ensuring that each slave wheel is turning about the same point on travel surface 106 as the master wheel.

Because each wheel may be starting the right turn operation from a different steering angle, main computer 702 determines a difference between each slave wheel starting steering angle to a target turn angle. The slave wheel target turn angle is determined based on the current steering angle of the master wheel. The slave wheel target turn angle command may change while the current steering angle of the master wheel changes during the right turn operation. During the turn operation, main computer 702 continuously generates steering angle commands for each of the slave wheels based on a current steering angle and the target steering angle for that slave wheel. Main computer 702 also attempts to achieve the turn as quickly as possible by determining which slave wheel has the greatest difference between the current steering angle and the target steering angle for that slave wheel. The slave wheel having the greatest difference between its current steering angle and its target steering angle is commanded to turn at the greatest rate by commanding the respective steer motor 414 to its maximum speed. Steer motors 414 for the remaining slave wheels are commanded to a speed that is proportional to the difference between that wheel's current steering angle and its target angle. When right turn pushbutton 714 is released, the master wheel steer command stops the master wheel at the current steering angle. A left turn operation performs in a similar manner.

If joystick speed control input 712 is manipulated to generate a speed command signal during a turn operation, a maximum drive speed is determined by several factors and are reduced based on any combination of a current chassis angle with respect to level, a current platform height, and a current maximum steering angle of any of the steerable wheels. The drive speed is fully proportional to the user input with the maximum user input corresponding to the determined maximum drive speed.

Scuffing of the drive wheels, when the wheels are steered from center, is eliminated by reducing the drive speed of the drive wheel corresponding to the inside wheel proportionally to the ratio of the outside drive wheel turning radius to the inside drive wheel turning radius.

In operation, a steering mode of operation is selected using steering mode switch 713 and a direction of travel and speed are input using user input device 704 embodied, in this case, in a joystick for speed control and a right-turn pushbutton 714 and a left-turn button 716. Pushing the handle of joystick 712 straight forward commands scissors lift vehicle 100 to move straight forward at a speed proportional to an amount of movement of user input device 704.

Moreover, any of the wheels may include a brake (not shown) that is used to facilitate braking scissors lift vehicle 100. The brake may be embodied in a friction brake, a dynamic braking, a regenerative brake, or combinations thereof. In various embodiments, drive motor 710 is used for dynamic braking using resistors to dissipate heat and/or regenerative braking by using the momentum of scissors lift vehicle 100 in motion to generate electrical power for charging energy storage devices (not shown), such as, but not limited to batteries and/or supercapacitors.

Figure 8:
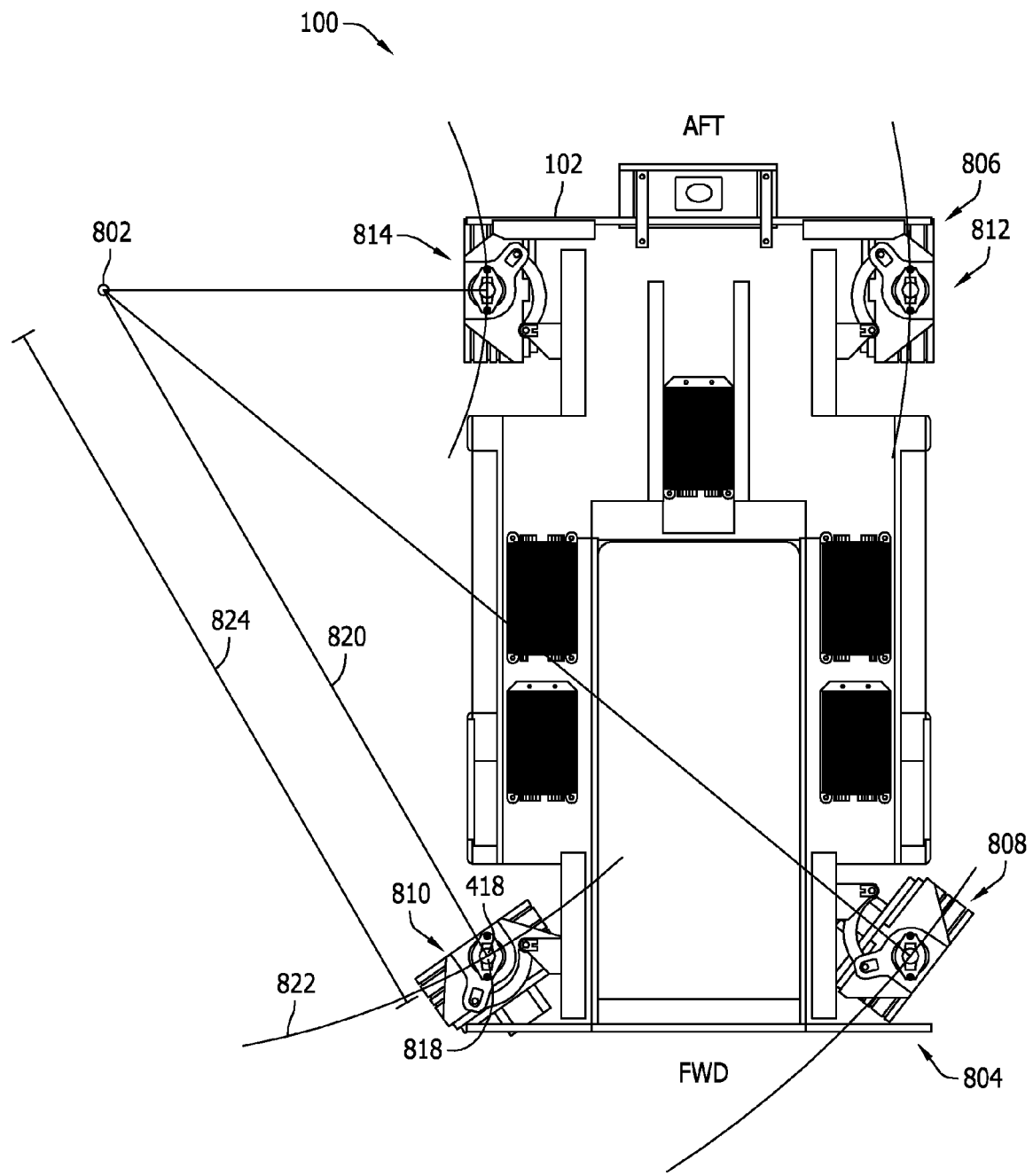

FIG. 8 is a plan view of carriage 102 (shown in FIG. 1) of scissors lift vehicle 100 (shown in FIG. 1) illustrating a turn about a center point 802. In the example embodiment, scissors stack assembly 112 and platform 113 are not shown for clarity. Carriage 102 includes a forward end 804 and an aft end 806. Forward end 804 includes a left wheel assembly 808 and a right wheel assembly 810. Aft end 806 includes a left wheel assembly 812 and a right wheel assembly 814. In the example embodiment, steering control system 700 operates in a two-wheel independent steering mode with wheel assemblies 808 and 810 being steered and wheel assemblies 812 and 814 being fixed a zero steering angle. Although one of the wheel assemblies is generally permanently designated as being the master wheel, any one of left wheel assembly 808, right wheel assembly 810, left wheel assembly 812, and right wheel assembly 814 may be designated as the master wheel. In such mode, the master wheel is commanded to turn at the maximum rate (i.e., steer motor 414 operated at full speed in the proper direction). The slave wheel receives from main computer 702 respective steer motor 414 speed commands. The steer motor 414 speed commands for the slave wheels cause the slave wheels to maintain synchronism with the master wheel. The slave wheels are commanded to a target angle based on center point 802, which is set using a turning radius of the master wheel. Center point 802 may change position during the period that the master wheel is turning, necessitating continuously changing steer motor speed commands be determined and transmitted to slave wheel steer motor 414. When right turn pushbutton 714 or left turn button 716 is released, the master wheel stops turning and center point 802 then becomes a fixed point about which the master wheel is turning and the slave wheel steer motor speed commands will reach zero RPM when the current steering angle of the slave wheel match the target steering angle for the slave wheel. Accordingly, each steerable wheel have a steering angle that puts the wheel orthogonal to center point 802 and will travel in a direction tangent to a circle having its center at center point 802 and a radius equal to a distance from center point 802 to a steer axis of rotation of each respective wheel. For example, wheel assembly 810 includes a wheel 816 having a steer axis of rotation 818 that extends into and out of the page in this view. A radius 820 of a turning circle 822 of wheel 816 about center point 802 is defined between center point 802 and steer axis of rotation 818. A distance 824 of radius 820 defines a turn radius of wheel 816. Typically, all four wheels of scissors lift vehicle 100 can have a different steering angle for any given turn.

Figure 9:
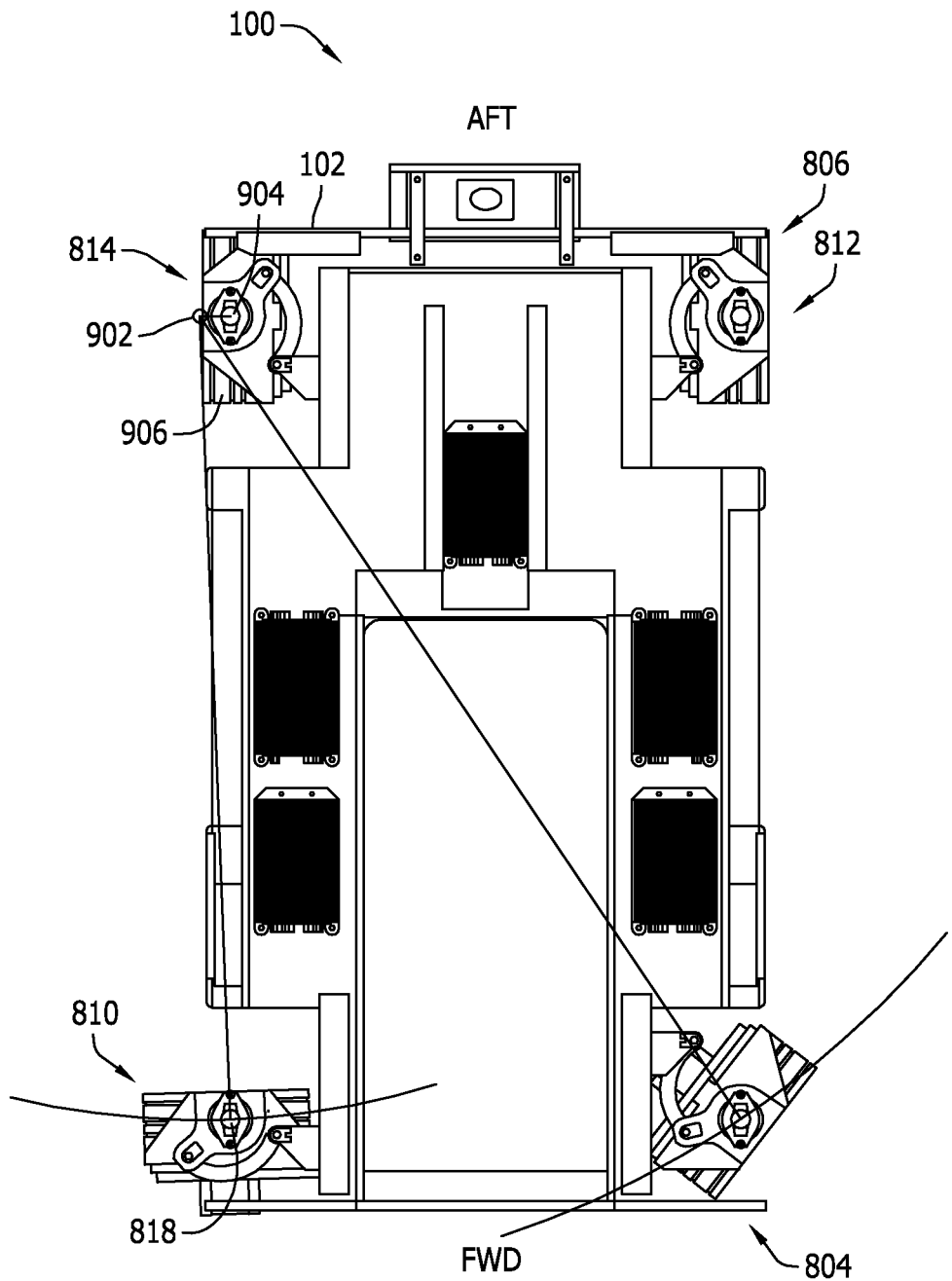

FIG. 9 is a plan view of carriage 102 (shown in FIG. 1) of scissors lift vehicle 100 (shown in FIG. 1) illustrating a two-steerable wheel turn about a center point 902. In the example embodiment, scissors stack assembly 112 and platform 113 are not shown for clarity. The operation of steering control system 700 for this turn is similar to the operation described above with reference to FIG. 8. Center point 902 is located proximate a steer axis of rotation 904 of a wheel 906 of wheel assembly 814. Accordingly, scissors lift vehicle 100 will essentially be turning about wheel 906. To accomplish this turn, in the example embodiment, wheel assembly 810 will be commanded to approximately a +90° angle with respect to carriage 102 and wheel assembly 808 will be commanded to approximately a +60° angle with respect to carriage 102. Wheel assembly 812 will be commanded to approximately a 0° angle with respect to carriage 102 as illustrated in FIG. 5. The illustrated angles are examples only, as the dimensions of scissors lift vehicle 100 may necessitate other angles to accomplish the turns described herein.

Figure 10:
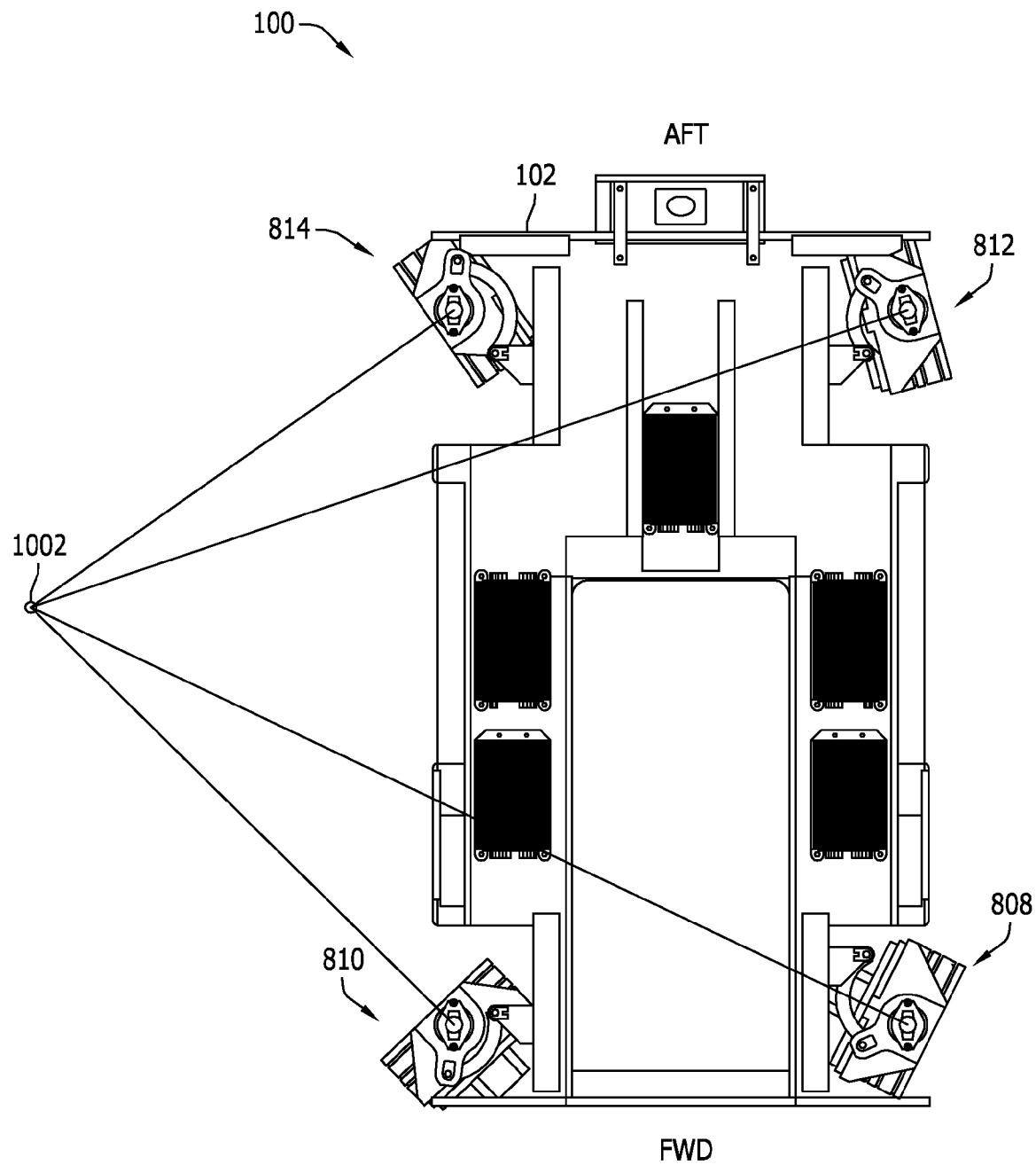

FIG. 10 is a plan view of carriage 102 (shown in FIG. 1) of scissors lift vehicle 100 (shown in FIG. 1) illustrating a four-steerable wheel turn about a center point 1002. In the example embodiment, scissors stack assembly 112 and platform 113 are not shown for clarity. Center point 1002 is positioned off the right-hand beam of carriage 102. To accomplish this turn, a master wheel assembly, such as, wheel assembly 810 is commanded to turn at a maximum rate by pressing right turn pushbutton 714. Each of wheel assemblies 808, 812, and 814 are designated as slave wheels to master wheel assembly 810. Main computer 702 synchronizes the turning of wheel assemblies 808, 812, and 814 to that of master wheel assembly 810. Main computer determines center point 1002 using the current steering angle of master wheel assembly 810 and determines a target angle for each of wheel assemblies 808, 812, and 814. Main computer then determines a steer motor speed command for each of wheel assemblies 808, 812, and 814 based on a difference between the current steering angle of wheel assemblies 808, 812, and 814 and their respective target angles. The wheel assembly having the greatest difference is commanded to turn at full speed and the other slave wheel assemblies are commanded to a turn speed proportional to each slave wheel assembly difference between its current steering angle and its respective target angle. The steer motor speed command for each slave wheel assembly is continuously updated based on changing conditions associated with the master wheel assembly and/or scissors lift vehicle 100.

Figure 11:
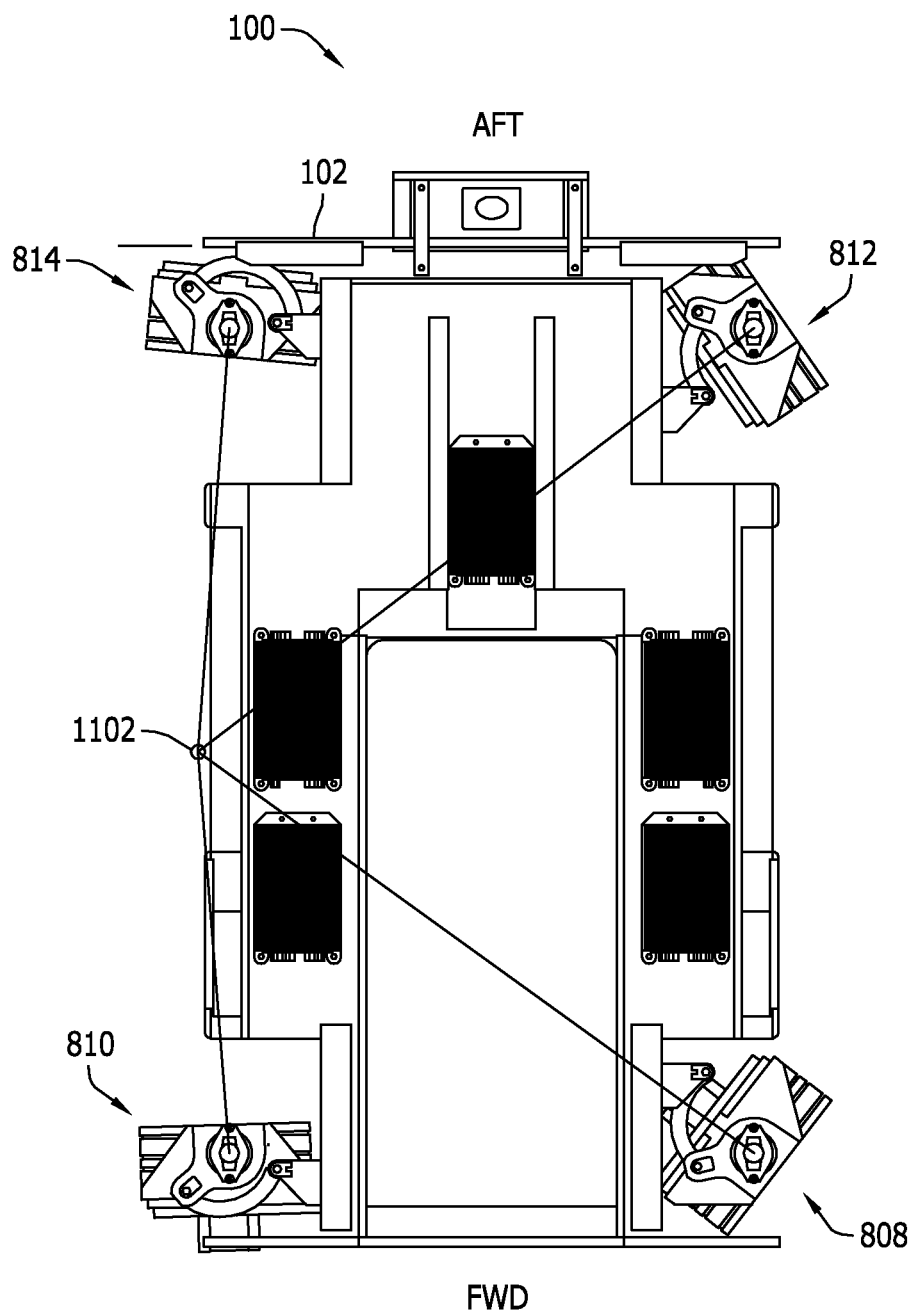

FIG. 11 is a plan view of carriage 102 (shown in FIG. 1) of scissors lift vehicle 100 (shown in FIG. 1) illustrating a turn about a center point 1102 positioned closely abeam carriage 102. In the example embodiment, scissors stack assembly 112 and platform 113 are not shown for clarity. Center point 1002 is positioned just off the right-hand beam of carriage 102.

Figure 12:
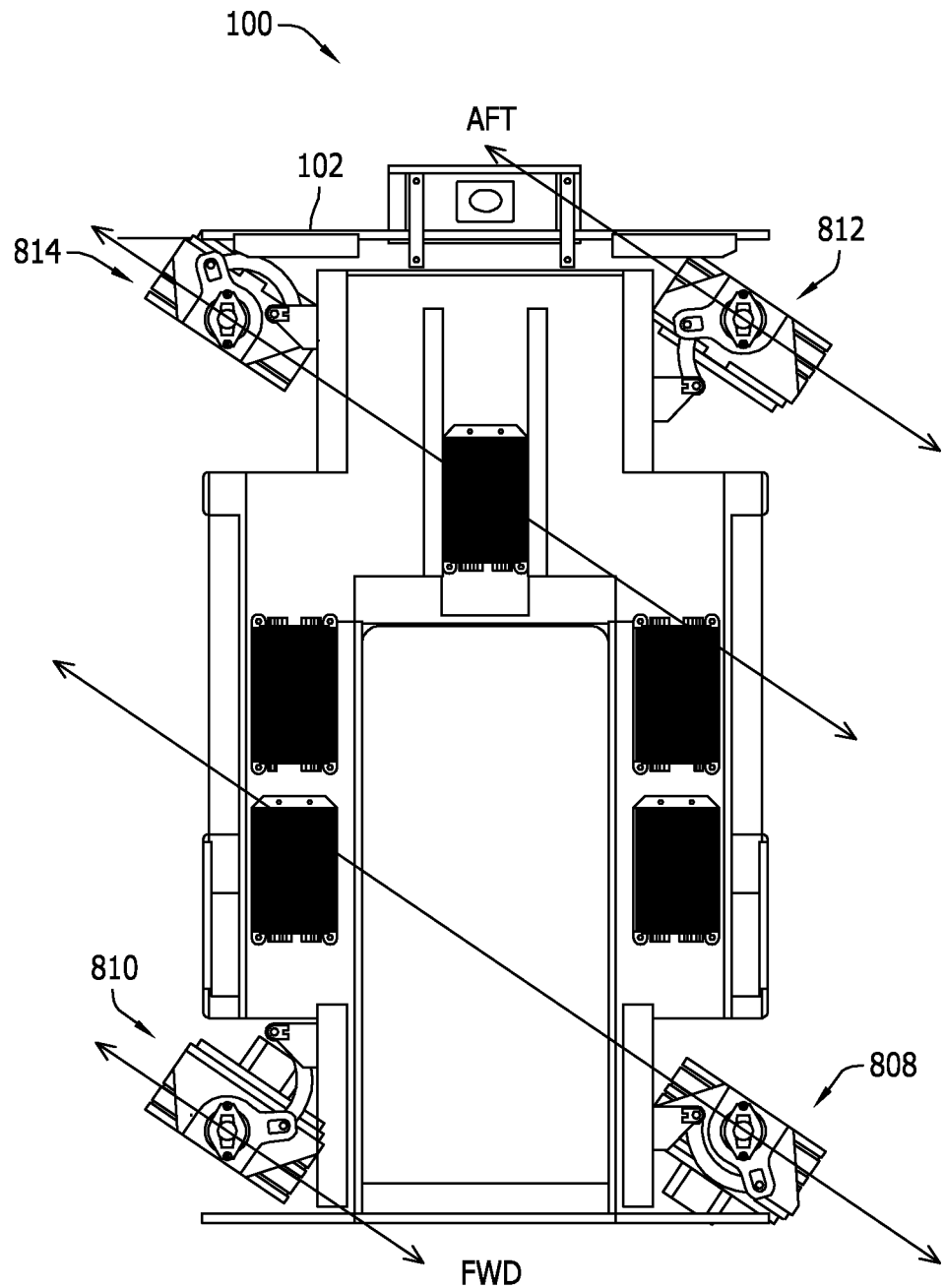

FIG. 12 is a plan view of carriage 102 (shown in FIG. 1) of scissors lift vehicle 100 (shown in FIG. 1) illustrating a crab movement of carriage 102. In the example embodiment, scissors stack assembly 112 and platform 113 are not shown for clarity. To accomplish this movement, a crab mode of steering is selected and user input device is manipulated to such that a master wheel assembly is commanded by main computer 702 to a steering angle in the direction of the crab movement. Main computer 702 generates a slave wheel assembly target steering angle equal to the current steering angle of the master wheel assembly. Each slave wheel assembly achieves its respective target angle as described above. In a crab movement, carriage 102 moves in a linear direction selected without turning about a center point.

Figure 13:
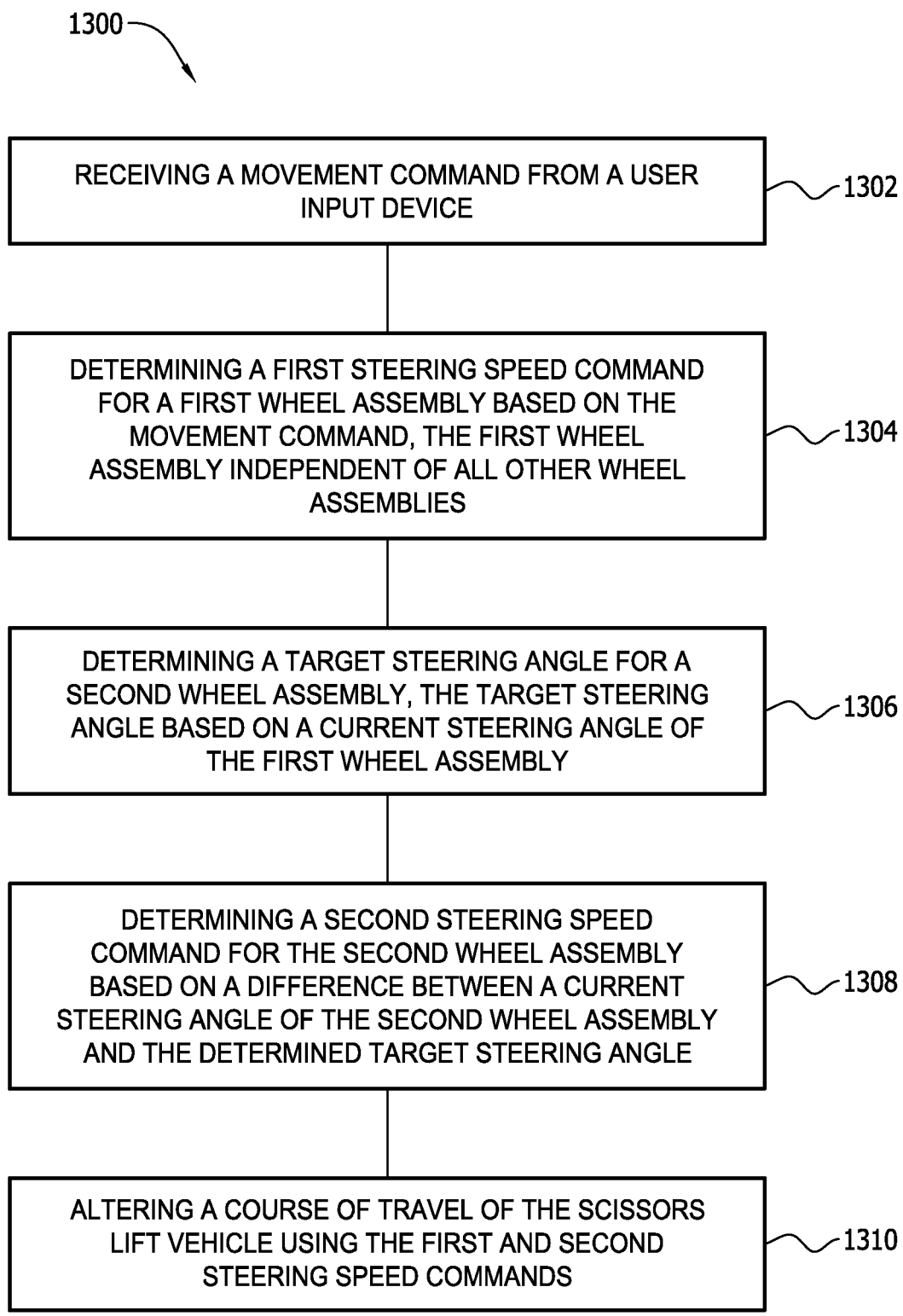

FIG. 13 is a flow diagram of a method 1300 of controlling the scissors lift vehicle (shown in FIG. 1) that includes a plurality of wheel assemblies. In the example embodiment, method 1300 includes receiving 1302 a steer command from a user input device, determining 1304 a first steering speed command for a first wheel assembly based on the steer command, the first wheel assembly independent of all other wheel assemblies, and determining 1306 a target steering angle for a second wheel assembly, the target steering angle based on a current steering angle of the first wheel assembly. Method 1300 also includes determining 1308 a second steering speed command for the second wheel assembly based on a difference between a current steering angle of the second wheel assembly and the determined target steering angle and altering 1310 a course of travel of the scissors lift vehicle using the first and second steering speed commands.

Optionally, wherein the scissors lift vehicle includes a scissors stack assembly and a scissors stack height sensor, method 1300 includes determining the speed command based on the current speed of the scissors lift vehicle and a scissors stack height. Method 300 also optionally includes determining a point about which the scissors lift vehicle will turn based on the received steer command. Method 300 further optionally includes determining a steering angle command for a wheel assembly that aligns an axis of rotation of the wheel assembly with the determined point. Method 300 further optionally includes modifying at least one of a speed of the scissors lift vehicle and a direction of travel of the scissors lift vehicle comprises dynamically braking or regeneratively braking at least some of the plurality of wheel assemblies. Method 300 further optionally includes modifying at least one of a speed of the scissors lift vehicle and a direction of travel of the scissors lift vehicle comprises friction braking at least some of the plurality of wheel assemblies. Method 300 further optionally includes modifying at least one of a speed of the scissors lift vehicle and a direction of travel of the scissors lift vehicle comprises applying friction braking to at least some of the plurality of wheel assemblies using a bias member.

The process flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of a scissors lift vehicle provide a cost-effective and reliable means of lifting workers to an elevated work site. More specifically, the methods and systems described herein facilitate a worker's ingress and egress to a work platform coupled to a scissors lift assembly portion of the scissors lift vehicle. In addition, the above-described methods and systems facilitate accessing narrow portals to work areas. As a result, the methods and systems described herein facilitate worker safety and work site access in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A scissors lift vehicle system comprising a carriage including a plurality of independently steerable wheel assemblies configured to engage a travel surface, said plurality of independently steerable wheel assemblies, each steerable about a steer axis of rotation, one of said wheel assemblies designated a master wheel, the remaining wheel assemblies being designated slave wheels, said wheel assemblies each comprising:
a variable-speed steer actuator configured to rotate said wheel assembly about the steer axis of rotation at a selectable rate, said master wheel assembly being rotated at a rate based on a first steer actuator speed command, each said slave wheel assembly being rotated at a rate based on a generated steering angle target for that slave wheel assembly that is based on the current steering angle of the master wheel, and a received current steering angle from that slave wheel assembly;
a wheel comprising a respective drive axis of rotation;
a variable-speed drive actuator configured to rotate said wheel about a respective drive axis of rotation at a selectable rate.

2. The scissors lift vehicle system of claim 1, further comprising a one or more processors coupled to one or more memory devices, said one or more processors configured to:
receive a steer input from a user input device;
generate a steer actuator speed command signal based on the steer input; and
transmit the speed command signal to the variable-speed steer actuator of the designated master wheel assembly.

3. The scissors lift vehicle system of claim 2, wherein said one or more processors are further configured to generate a steer actuator speed command signal that represents a maximum speed command signal of the variable-speed steer actuator.

4. The scissors lift vehicle system of claim 2, wherein said one or more processors are further configured to:
receive a current steering angle from each wheel assembly designated as a slave wheel assembly;
receive a current steering angle from the wheel assembly designated as the master wheel assembly;
generate a respective steering angle target for each of each wheel assemblies designated as a slave wheel assembly, the steering angle target based on the received current steering angle from the master wheel assembly; and
transmit a respective steer actuator speed command to each slave wheel assembly, the steer actuator speed command for each slave wheel assembly based on the generated steering angle target for that slave wheel assembly and the received current steering angle from that slave wheel assembly.

5. The scissors lift vehicle system of claim 2, wherein said one or more processors are further configured to generate a steer actuator speed command signal that causes the master wheel assembly to turn the master wheel at the maximum rate.

6. The scissors lift vehicle system of claim 2, wherein said scissors lift vehicle system further comprises a steer mode selector, said one or more processors are further configured to receive a selection of a two-wheel steering mode or a four-wheel steering mode.

7. The scissors lift vehicle system of claim 2, wherein said scissors lift vehicle system further comprises a steer mode selector, said one or more processors are further configured to receive a selection of a crab steering mode.

8. The scissors lift vehicle system of claim 2, wherein said scissors lift vehicle system further comprises a steer mode selector, said one or more processors are further configured to:
receive a selection of a crab steering mode;
receive a direction of crab input;
generate a steering angle command for the master wheel assembly in the direction of the received direction of crab movement; and
generate a target steering angle command for the slave wheels equal to a current steering angle of the master wheel assembly.

9. The scissors lift vehicle system of claim 1, wherein each wheel comprises a respective axle independent of an axle of any other wheel.

10. The scissors lift vehicle system of claim 1, wherein said variable-speed steer actuator comprises a ball screw coupled to a steer motor.

11. The scissors lift vehicle system of claim 1, further comprising a steering angle position sensor associated with each steerable wheel, said steering angle position sensor configured to detect a relative angular position of the wheel and to generate a steering angle position signal.

12. The scissors lift vehicle system of claim 11, further comprising a user input device configured to receive a manual input and generate a steering command signal, the steering command signal and the steering angle position signal used to generate a variable-speed steer actuator speed signal.

13. A method of controlling a scissors lift vehicle, the scissors lift vehicle including a plurality of wheel assemblies, the method comprising:
receiving a steer command from a user input device;
determining a first steering speed command for a first wheel assembly based on the steer command, the first wheel assembly independent of all other wheel assemblies;
determining a target steering angle for a second wheel assembly, the target steering angle based on a current steering angle of the first wheel assembly;
determining a second steering speed command for the second wheel assembly based on a difference between a current steering angle of the second wheel assembly and the determined target steering angle; and
altering a course of travel of the scissors lift vehicle using the first and second steering speed commands.

14. The method of claim 13, further comprising determining a drive speed command based on a current drive speed of the scissors lift vehicle and a speed command.

15. The method of claim 14, wherein the scissors lift vehicle includes a scissors stack assembly and a scissors stack height sensor and wherein determining a drive speed command further comprises determining the speed command based on the current speed of the scissors lift vehicle, the speed command, and a scissors stack height.

16. The method of claim 14, wherein determining a drive speed command comprises determining a braking command for at least some of the plurality of wheel assemblies.

17. The method of claim 14, further comprising altering a speed of travel of the scissors lift vehicle using at least one of friction braking, dynamic braking, and regenerative braking based on the braking command.

18. The method of claim 13, wherein the scissors lift vehicle comprises a master wheel assembly and a plurality of slave wheel assemblies, said method further comprising determining the second steering speed command for each slave wheel based on a difference between a current steering angle of the slave wheel assembly and a respective target angle for that slave wheel assembly.

19. A scissors lift vehicle comprising:
- a carriage comprising four independently steerable wheel assemblies, one wheel assembly of the plurality of independently steerable wheel assemblies designated as a master wheel assembly, a reminder of the wheel assemblies designated as being slave wheel assemblies, each wheel assembly comprising a wheel configured to engage a travel surface, each wheel assembly comprising a steer axis of rotation, each of said plurality of wheel assemblies positioned proximate a respective corner of said carriage;
- a scissors stack assembly coupled to said carriage, said scissors stack assembly comprising a plurality of scissors linkages extendable from a retracted position, where said scissors linkages are approximately horizontally configured to an extended position, where said scissors linkages are approximately orthogonally configured with respect to each other;
- a user input device configured to generate a steer command;
- a steering angle position sensor coupled to each independently steerable wheel assembly and configured to generate a current steering angle position signal;
- a processor communicatively coupled to a memory device, said memory device including instructions that are executable by said processor, said processor configured to:
  - receive the steer command from the user input device;
  - generate a maximum speed steering rate command for the master wheel assembly using the received steer command;
  - determine a target steering angle for each slave wheel assembly based on a current steering angle of the master wheel assembly;
  - generate a steering rate command for each of the slave wheel assemblies, the steering rate command proportional to a difference between the determined target steering angle for each slave wheel assembly and its current steering angle; and
  - transmit a respective generated steering rate command to each slave wheel assembly.

20. The scissors lift vehicle of claim 19, said processor configured to generate a maximum steering rate command for the slave wheel assembly having the greatest difference between the determined target steering angle for that slave wheel assembly and its current steering angle.

* * * * *